(12) United States Patent
Hassan et al.

(10) Patent No.: US 9,868,174 B2
(45) Date of Patent: Jan. 16, 2018

(54) SLIP-FIT NOZZLE ASSEMBLY FOR AN ARC WELDING APPARATUS

(71) Applicant: Victor Equipment Company, Denton, TX (US)

(72) Inventors: Khalid Hassan, Denton, TX (US); Glenn K. Redding, Flower Mound, TX (US)

(73) Assignee: Victor Equipment Company, Denton, TX (US)

( * ) Notice: Subject to any disclaimer, the term of this patent is extended or adjusted under 35 U.S.C. 154(b) by 490 days.

(21) Appl. No.: 14/540,060

(22) Filed: Nov. 13, 2014

(65) Prior Publication Data

US 2015/0165542 A1   Jun. 18, 2015

Related U.S. Application Data

(60) Provisional application No. 61/903,950, filed on Nov. 13, 2013, provisional application No. 62/053,784, filed on Sep. 22, 2014.

(51) Int. Cl.

| B23K 9/16 | (2006.01) |
|---|---|
| B23K 9/29 | (2006.01) |
| B23K 9/28 | (2006.01) |
| B23K 9/173 | (2006.01) |
| B21D 19/00 | (2006.01) |
| B23K 9/32 | (2006.01) |

(52) U.S. Cl.
CPC .............. B23K 9/295 (2013.01); B21D 19/00 (2013.01); B23K 9/173 (2013.01); B23K 9/285 (2013.01); B23K 9/32 (2013.01)

(58) Field of Classification Search
CPC .................. B21D 19/00; B23K 9/173; B23K 9/28–9/287; B23K 9/291–9/295; B23K 9/32–9/323
USPC .......................................... 219/137.2–137.63
See application file for complete search history.

(56) References Cited

U.S. PATENT DOCUMENTS

| 1,828,459 A | 10/1931 | Cornell et al. |
| 1,835,179 A | 12/1931 | Rue et al. |

(Continued)

FOREIGN PATENT DOCUMENTS

| CN | 201902729 U | 7/2011 |
| DE | 231519 A1 | 1/1986 |

(Continued)

OTHER PUBLICATIONS

International Search Report and Written Opinion dated Feb. 29, 2016 for PCT/US2015/060377 filed Nov. 12, 2015.

(Continued)

*Primary Examiner* — Sang Y Paik
(74) *Attorney, Agent, or Firm* — Edell, Shapiro & Finnan, LLC

(57) ABSTRACT

A nozzle assembly for a welding torch and a welding torch including said nozzle assembly is provided. The nozzle assembly generally comprises a nozzle body having an internal bore with a plurality of detents disposed within a portion of the internal bore and an insert assembly having a proximal exterior surface with a plurality of sealing members. The insert assembly is adapted to be secured within the internal bore of the nozzle body by the plurality of sealing members progressively engaging the plurality of detents.

17 Claims, 14 Drawing Sheets

(56) References Cited

U.S. PATENT DOCUMENTS

| | | |
|---|---|---|
| 2,432,639 A | 12/1947 | Webster et al. |
| 2,438,292 A | 3/1948 | Linker et al. |
| 3,018,360 A | 1/1962 | Engel et al. |
| 3,629,547 A | 12/1971 | Kester et al. |
| 4,105,891 A | 8/1978 | Hill et al. |
| 4,158,765 A | 6/1979 | Moerke |
| 4,467,175 A | 8/1984 | Reeh et al. |
| 4,554,432 A | 11/1985 | Raloff |
| 5,491,321 A * | 2/1996 | Stuart .................... B23K 9/323 219/137.41 |
| 5,669,556 A | 9/1997 | Yoshida |
| 7,905,741 B1 | 3/2011 | Wade et al. |
| 2004/0026394 A1 | 2/2004 | Giese |
| 2005/0109738 A1 | 5/2005 | Hewett et al. |
| 2007/0062922 A1 | 3/2007 | Zamuner |
| 2007/0210049 A1 | 9/2007 | Dingeldein |
| 2008/0035626 A1 | 2/2008 | Christopher et al. |
| 2008/0188093 A1 | 8/2008 | Jaeger |
| 2008/0290074 A1 | 11/2008 | Speker et al. |
| 2009/0050609 A1 | 2/2009 | Berger et al. |
| 2011/0000893 A1 | 1/2011 | Blankenship et al. |
| 2013/0134143 A1 | 5/2013 | Hassan et al. |
| 2014/0263253 A1 | 9/2014 | Meess et al. |

FOREIGN PATENT DOCUMENTS

| | | |
|---|---|---|
| JP | S60-71482 U | 5/1985 |
| JP | S60-170574 A | 9/1985 |
| JP | H07256462 A | 10/1995 |
| JP | 2004276084 A | 10/2004 |
| JP | 2004-322127 A | 11/2004 |
| JP | 2009-142850 A | 7/2009 |
| KR | 2012-0000369 U | 1/2012 |
| KR | 2012-0081460 A | 7/2012 |
| WO | 2013157036 A1 | 10/2013 |

OTHER PUBLICATIONS

International Search Report and Written Opinion dated Apr. 14, 2015 for International Application No. PCT/US2014/065577 filed Nov. 13, 2014.

International Search Report and Written Opinion dated Apr. 1, 2015 for International Application No. PCT/US2014065353 filed Nov. 13, 2014.

International Search Report and Written Opinion dated Apr. 1, 2015 for International Application No. PCT/US2014/065566 filed Nov. 13, 2015.

International Search Report and Written Opinion dated Mar. 18, 2015 for International Application No. PCT/US2015/065340 filed Nov. 13, 2014.

IInternational Search Report and Written Opinion dated Apr. 1, 2015 for International Application No. PCT/US2014/065351 filed Nov. 13, 2014.

International Search Report and Written Opinion dated Mar. 6, 2015 for International Application No. PCT/US2014/065504 filed Nov. 13, 2014.

International Search Report and Written Opinion dated Mar. 25, 2015 for International Application No. PCT/US2014/065346 filed Nov. 13, 2014.

International Search Report and Written Opinion dated Apr. 1, 2015 for International Application No. PCT/US2014/065487 filed Nov. 13, 2014.

* cited by examiner

SLIP-FIT NOZZLE ASSEMBLY FOR AN ARC WELDING APPARATUS

CROSS-REFERENCE TO RELATED APPLICATIONS

This application claims the benefit of provisional application Ser. No. 61/903,950, filed on Nov. 13, 2013, and provisional application Ser. No. 62/053,784, filed on Sep. 22, 2014. The disclosures of the above applications are incorporated herein by reference in their entirety.

FIELD

The present disclosure relates generally to welding apparatuses, and more particularly to arc welding apparatuses such as Metal Inert Gas (MIG) or Gas Metal Arc Welding (GMAW) welding guns, including consumables for generating a welding arc and diffusing a shield gas.

BACKGROUND

The statements in this section merely provide background information related to the present disclosure and may not constitute prior art.

In an arc welding apparatus, such as Metal Inert Gas (MIG) or Gas Metal Arc Welding (GMAW) welding gun, a welding wire is fed through the welding gun to provide a molten metal pool to join metal work pieces together. An inert gas is directed through the front (distal) end of the welding gun to provide a surrounding layer or blanket of shielding gas to protect the molten metal pool from atmospheric contamination. The inert gas is typically a combination of various gases such as argon or helium, among others.

A prior art MIG or GMAW welding gun typically includes a contact tip and a gas diffuser connected to the contact tip. The contact tip has a central bore to guide the welding wire to the work pieces. The contact tip transfers electrical current to the welding wire. The contact tip is typically threaded into the gas diffuser and the gas diffuser defines gas passageways that direct the shielding gas around the contact tip. The contact tip and gas diffuser are constantly subjected to high heat and are susceptible to wear due to high temperature operation. A nozzle assembly surrounds the contact tip and gas diffuser. The nozzle assembly further directs the shielding gas towards the work pieces to blanket the molten metal pool.

SUMMARY

The present disclosure generally provides a nozzle assembly for a welding torch that comprises a nozzle body having an internal bore with a plurality of detents disposed within a portion of the internal bore and an insert assembly having a proximal exterior surface with a plurality of sealing members. The insert assembly is adapted to be secured within the internal bore of the nozzle body by the plurality of sealing members progressively engaging the plurality of detents.

The nozzle body comprises an insulator that may be over molded onto the nozzle body, such that the insulator further defines the internal bore with the plurality of detents being located at a proximal end portion. The plurality of detents may include a series of grooves spaced along the internal bore to progressively engage the sealing members. The insulator is comprised of a material that is capable of withstanding the amperage used in a duty cycle of the welding torch.

The nozzle assembly may further comprise an insulator and a nozzle sleeve secured within the nozzle body, such that the nozzle sleeve assists in defining the internal bore. The nozzle sleeve may include one selected from a metal, a metal alloy, or a plastic material that is capable of withstanding the amperage applied to the welding torch and the heat generated during the use of the torch.

The sealing members of the insert assembly are defined by a plurality of grooves in the proximal exterior surface and a plurality of spring bands disposed within the grooves. The spring bands may be split ring seals that provide an outward bias force and engage the plurality of detents, such that the insert assembly is secured to the nozzle body. The insert assembly is threaded onto a conductor tube and secures a contact tip to the conductor tube. The nozzle body may have three detents that secure the nozzle body to the insert assembly in three positions relative to a distal opening in the nozzle body and the contact tip.

According to one aspect of the present disclosure, the insert assembly comprises a nozzle insert, an insulator, and a slip adapter that are secured together. The slip adaptor defines a proximal exterior surface with a plurality of grooves and a plurality of spring bands disposed within the grooves. The plurality of spring bands may be independently selected to be a split spring ring or a spring metal band. The spring bands provide a biased outward force and engage the plurality of detents in the internal bore of the nozzle body. The plurality of spring bands may define circumferentially spaced protrusions that provide tactile feedback and assist in positioning the nozzle body relative to a contact tip.

According to another aspect of the present disclosure, an arc welding apparatus is provided. The arc welding apparatus comprises a handle, a conductor tube attached to the handle, and a consumable assembly attached to the conductor tube. The consumable assembly comprises both a contact tip and the nozzle assembly as previously described above and further defined herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 13:
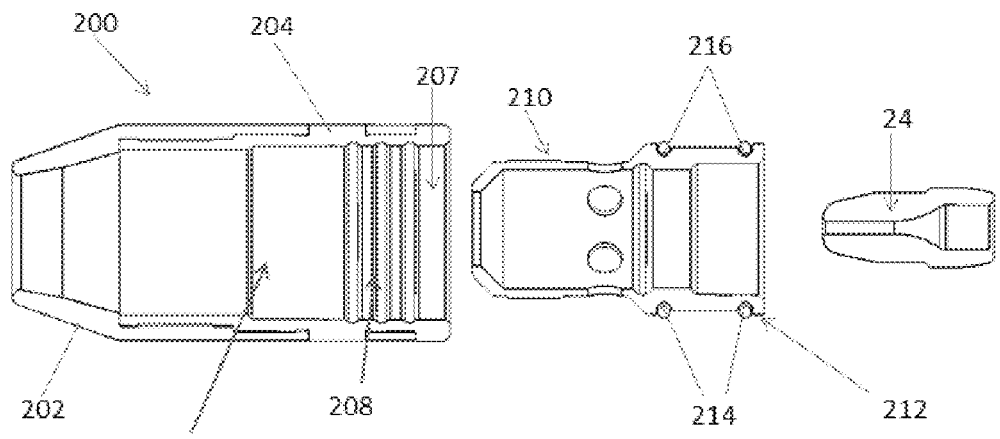
Figure 14:
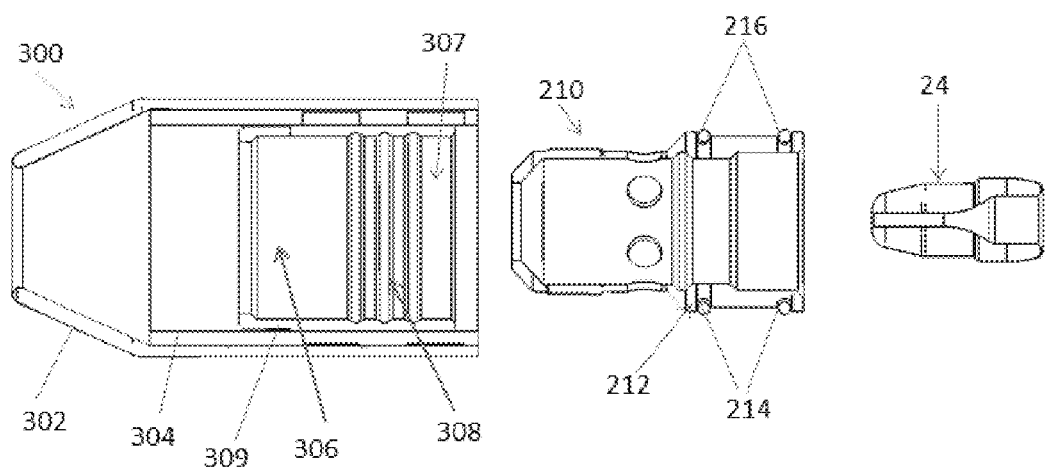
Figure 15:
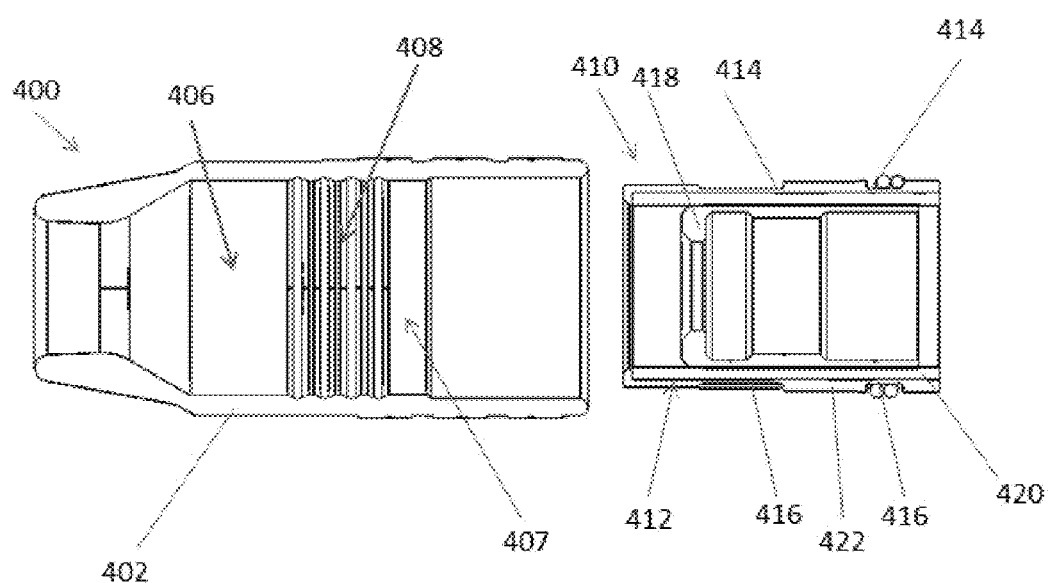
Figure 16:
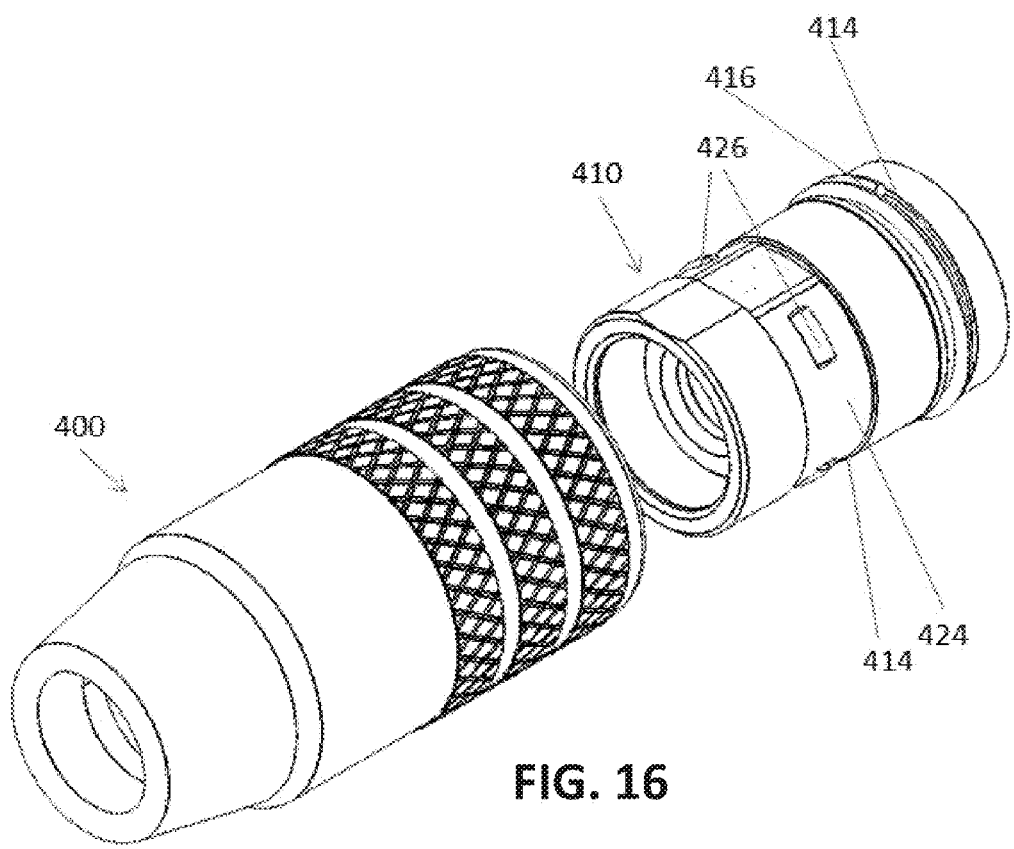

FIG. 13 an exploded cross-sectional view of a slip-on nozzle assembly constructed in accordance with the teachings of the present disclosure;

FIG. 14 an exploded cross-sectional view of another form of a slip-on nozzle assembly constructed in accordance with the teachings of the present disclosure;

FIG. 15 is an exploded cross-sectional view of still another form of a slip-on nozzle assembly constructed in accordance with the teachings of the present disclosure; and FIG. 16 is a perspective view of the slip-on nozzle assembly of FIG. 15.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Although the term "MIG" and "GMAW" are used within the specification, it should be understood that the teachings of the present disclosure apply to any type of welding or cutting apparatus.

Figure 1:
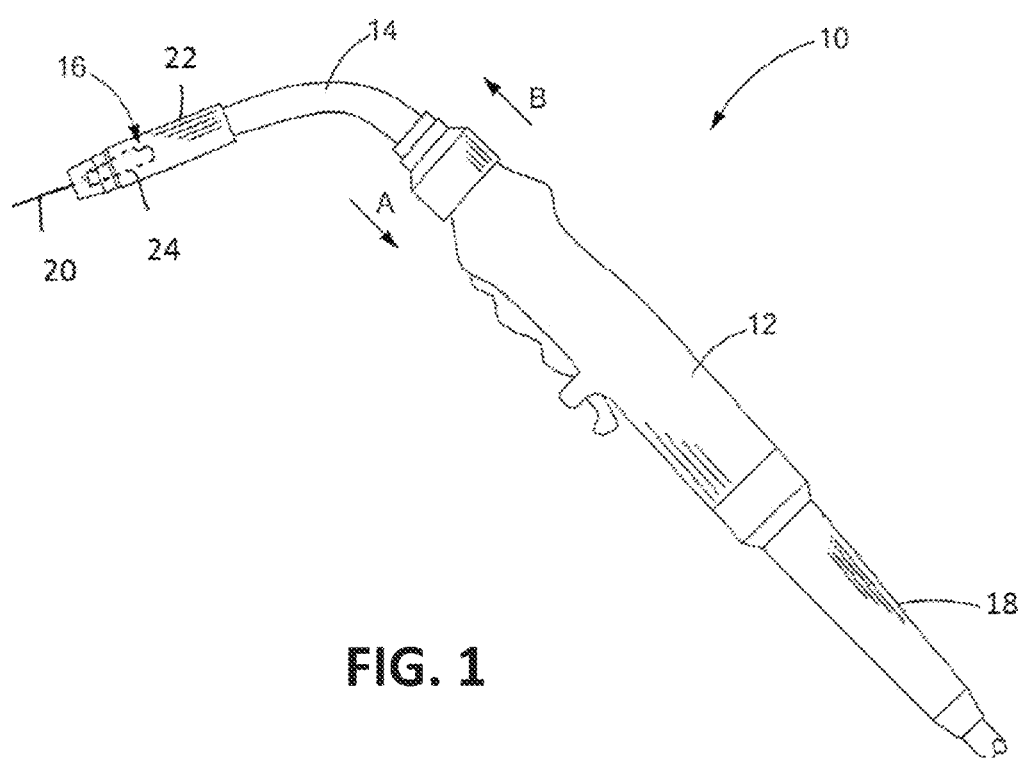
FIG. 1 is a side view of an arc welding apparatus.

Referring to FIG. 1, an arc welding apparatus, such as a MIG or GMAW welding gun, is illustrated and generally indicated by reference numeral 10. The MIG welding gun 10 includes a handle 12, a conductor tube 14 attached to the handle 12, and a consumable assembly 16 attached to the conductor tube 14. The handle 12 is connected to a welding cable 18 that carries welding current, shielding gas, and a welding wire 20 from a power source (not shown), a gas source (not shown), and a wire feeder (not shown) to the welding gun 10.

The consumable assembly 16 includes a plurality of consumable components including a nozzle assembly 22 and a contact tip 24. The structure and operation of an exemplary arc welding apparatus has been disclosed in U.S. Pat. Nos. 5,491,321 and 5,338,917, which are commonly owned by the assignee of the present application, and the contents of which are incorporated herein by reference in their entirety. In addition, the structure and operation of the arc welding apparatus 10 incorporating a contact tip that provides for the function as a contact tip and a diffuser has been disclosed in related U.S. Published Application No. 2013/0126506, which is commonly owned by the assignee of the present application, and the contents of which are incorporated herein by reference in their entirety.

Figure 2:
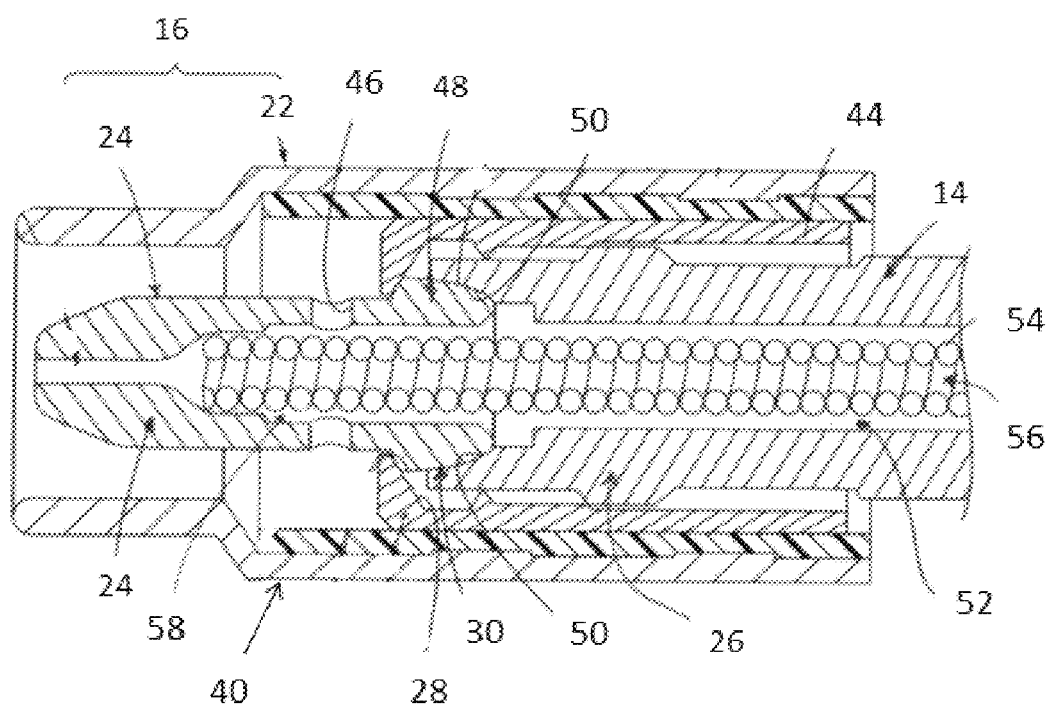
FIG. 2 is a cross-sectional view of a consumable assembly and a conductor tube assembly constructed in accordance with the teachings of the present disclosure.

Referring to FIG. 2, the consumable assembly 16 is connected to a distal end portion 26 of the conductor tube 14. A nozzle assembly 22 is substantially cylindrical in one form and receives the distal end portion 26 of the conductor tube 14 therein. In one form, a contact tip 24 is coaxially disposed inside the nozzle assembly 22, which has a seating surface 28 that is configured to mate with an end portion 30 (which in one form is spherical as shown, but could be any shape including a linear or polynomial taper) of the contact tip 24 into the distal end portion 26 of the conductor tube 14.

In one form the nozzle assembly 22 is secured onto the distal end 26 of the conductor tube assembly 40, and the contact tip 24 engages the seating surface 28 of a nozzle insert 44. As the nozzle assembly 22 is tightened onto the conductor tube assembly 40, the seating surface 28 engages against a shoulder 46 of the contact tip 24, thereby urging the spherical tapered end 48 of the contact tip 24 into the spherical tapered seat 50 of the conductor tube 14. The nozzle insert 44 tightens onto the conductor tube assembly 40 and the spherical tapered end 48 of the contact tip 24 is secured into engagement with the tapered seat 50.

The conductor tube 14 defines an internal passageway 52, and a conduit liner 54 is disposed within the internal passageway 52 as shown. The conduit liner 54 has a guiding channel 56 for guiding the welding wire 20 (not shown) to the contact tip 24. The conduit liner 54 may extend into an internal cavity 58 of the contact tip 24. The positioning of the conduit liner 54 within the internal cavity 58 provides a continuous guiding channel 56 for directly feeding the welding wire into the contact tip 24. Proper positioning of the conduit liner 54 within the contact tip 24, or "stick-out" relative to the distal end portion 26 of the conductor tube 14, is a factor for the correct operation of the welding torch 10. The conduit liner 54 directs the welding wire 20 through the welding cable 18, torch 10, conductor tube 14, and into the contact tip 24.

Additional aspects of the location and features of the conduit liner 54 within the internal cavity 58 of the contact tip 24 has been disclosed in U.S. Published Application No. 2013/0126504 A1, which is commonly owned by the assignee of the present application, and the contents of which are incorporated herein by reference in their entirety.

Figure 3A:
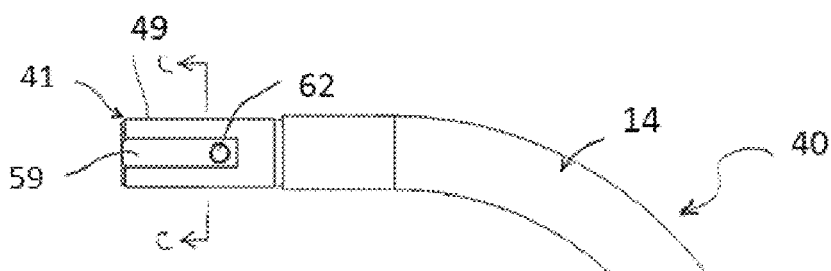
FIG. 3A is a side view of the conductor tube constructed in accordance with the teachings of the present disclosure.
Figure 3C:
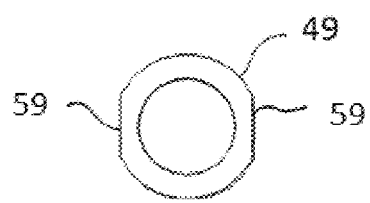
FIG. 3C is a cross-sectional view of the conductor tube of FIG. 3A taken along line C-C.
Figure 3B:
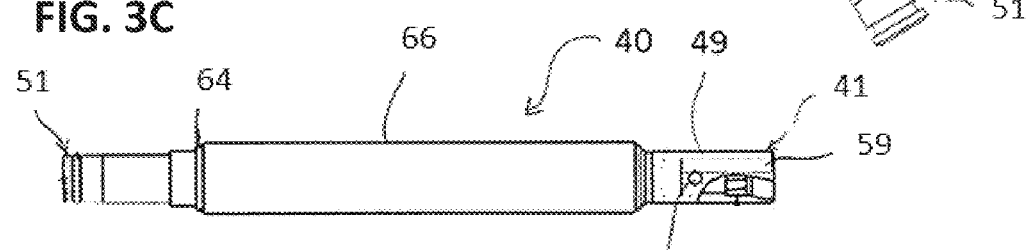
FIG. 3B is a side view of another form of the conductor tube constructed in accordance with the teachings of the present disclosure.

Referring to FIGS. 3A-3C, the conductor tube 14 can define a variety of geometries, and, a curved geometry of various degrees is used depending on the application requirements. The conductor tube 14 alternatively could be straight or flexible and configurable as has been disclosed in U.S. Published Application No. 2007/0284354, which is commonly owned by the assignee of the present application, and the contents of which are incorporated herein by reference in their entirety. The conductor tube assembly 40 extends a length between its distal end 41 and its proximal end 51. The proximal end 51 is adapted to be secured to the handle 12 of the welding gun 10, and the distal end 41 of the conductor tube 14 is adapted to receive the consumable assembly 16 (as shown in FIG. 1).

The distal end 41 of the conductor tube 14 provides unique features to allow for an efficient and robust connection with the consumable assembly 16, the nozzle assembly 22, and the contact tip 24. For example, in one form, the distal end 41 has an outer surface 49 that includes two opposing flat faces 59, that allows for an anti-rotational engagement with a sleeve (not shown). Additionally, in another form, the distal end 41 has a threaded opening 62 through at least one of the flat faces 59 for securing the sleeve.

The conductor tube 14 is typically made from a copper alloy or other metal that has conductive properties and then is coated with an insulation material 64, which in one form may be silicone, and finally covered with a tube jacket 66 to provide durability and additional insulation from the electric current, which flows through the conductor tube 14 during operation of the welding gun 10. The tube jacket 66 by way of example may be made from a brass or stainless steel metal or alloy in one form of the present disclosure.

Figure 4:
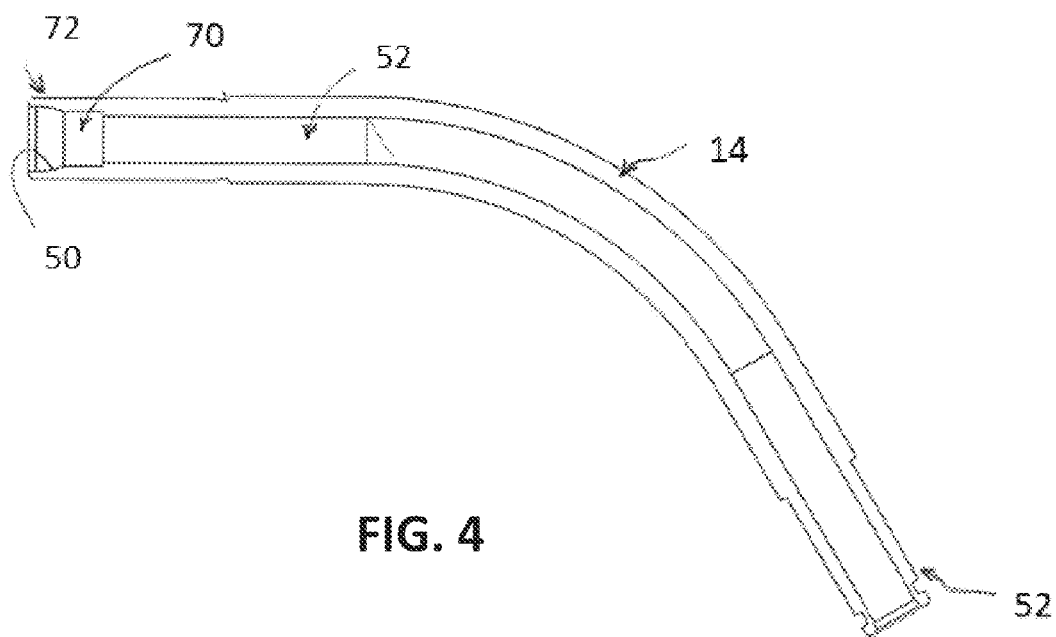
FIG. 4 is a cross-sectional view of another form of a conductor tube constructed in accordance with the teachings of the present disclosure.

As shown in FIG. 4, the conductor tube 14 is a hollow member defining the internal passageway 52. The internal passageway 52 includes a tailored cavity 70. The tailored cavity 70 is shaped to receive an alignment device (not shown in this figure), which in one form is press-fit therein. In addition, the internal passageway 52 at the distal end 72 includes a spherical tapered seat 50 forming a contact surface that engages with the contact tip 24.

Figure 5:
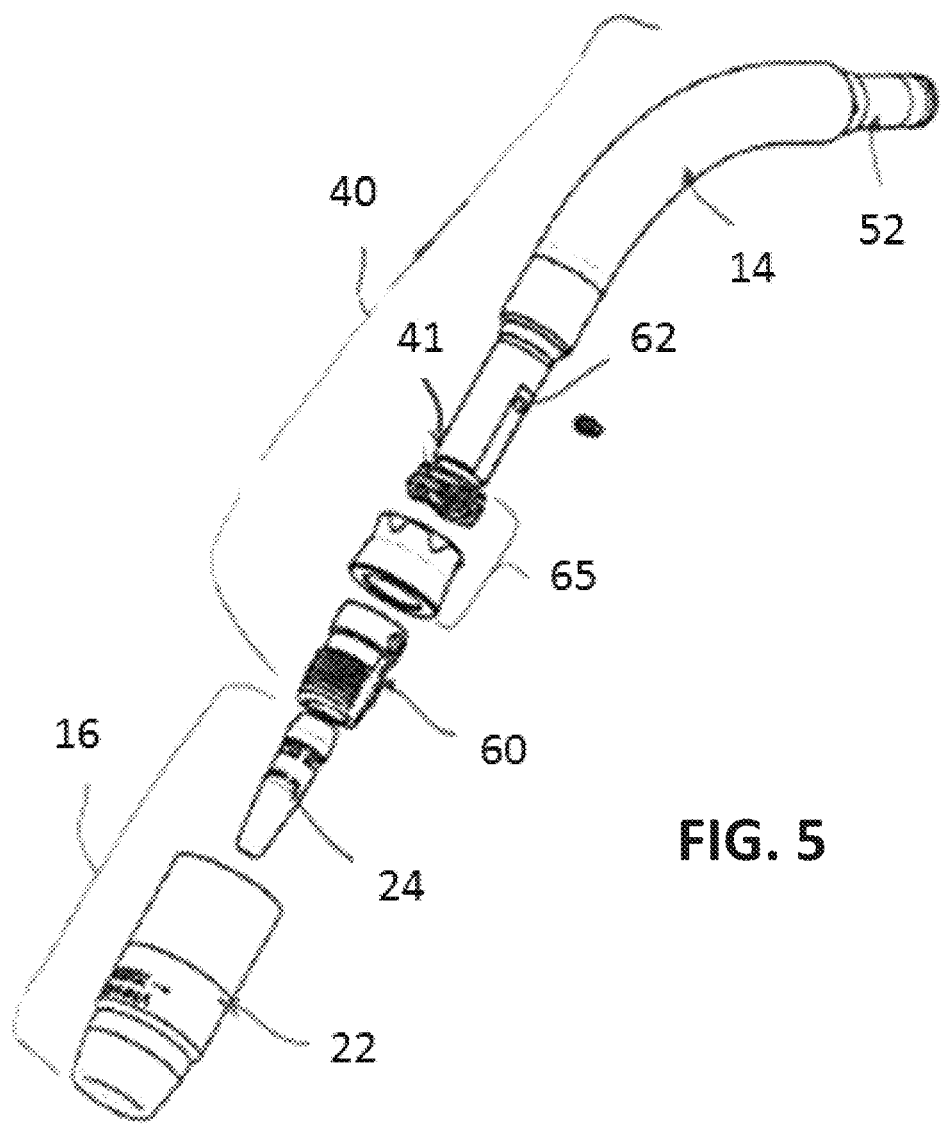
FIG. 5 is an exploded perspective view of a conductor tube assembly and a consumable assembly constructed in accordance with the teachings of the present disclosure.

FIG. 5 summarizes and illustrates components of the conductor tube assembly 40 and the consumable assembly 16. The consumable assembly 16 includes the nozzle assembly 22 and the contact tip 24. The consumable assembly 16 is secured to the distal end 41 of the conductor tube 14 via the sleeve 60, and the collar assembly 50 pretensions the consumable assembly 16 to the conductor tube assembly 40 as previously set forth.

The contact tip 24 has a body that defines an internal cavity extending from its proximal end portion to its distal end portion. Advantageously, the contact tip 24 is designed to function as both a contact tip for transferring electric current to the welding wire and a gas diffuser for diffusing shielding gas around the molten metal pool, thus providing a dual function while eliminating an additional component (i.e., a separate gas diffuser) from the consumable assembly 16.

Referring to FIGS. 6A-6C and 7-10, the nozzle assembly 22 includes a nozzle body 68 that is in one form generally cylindrical, an insulator 74, and a nozzle insert 44. As shown, the outer nozzle 68 extends from a proximal opening 78 to a distal opening 80. The nozzle body 68 may further include a nose portion 82 that narrows or extends inwardly to properly direct the shielding gas for a given application in relation to maintain the desired space 84 (FIG. 6A) for the contact tip 24. The nozzle insert 44 has a proximal end portion 86 and a distal end portion 88 and includes a central bore 90 extending from the proximal end portion 86 towards the distal end portion 88. The nozzle insert 44 at its distal end portion 88 defines an internal gas diverter 92. The internal gas diverter 92 further defines a seating surface 28 toward the proximal end portion of the nozzle insert 44. The seating surface 28 is chamfered in one form, for engaging the angled shoulder 46 of the contact tip 24. The internal gas diverter 92 defines a profiled diverter orifice 94 that extends distally from the central bore 90.

Figure 6A:
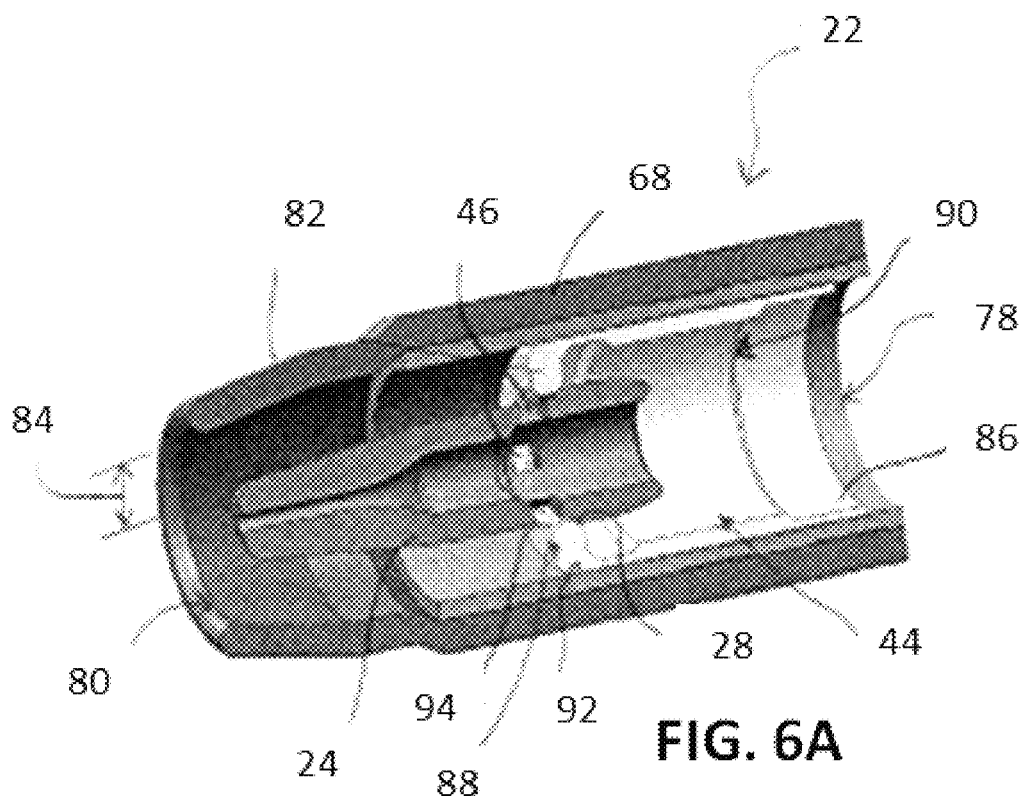
FIG. 6A is a perspective cross-sectional view of a consumable assembly constructed according to the teachings of the present disclosure.
Figure 6B:
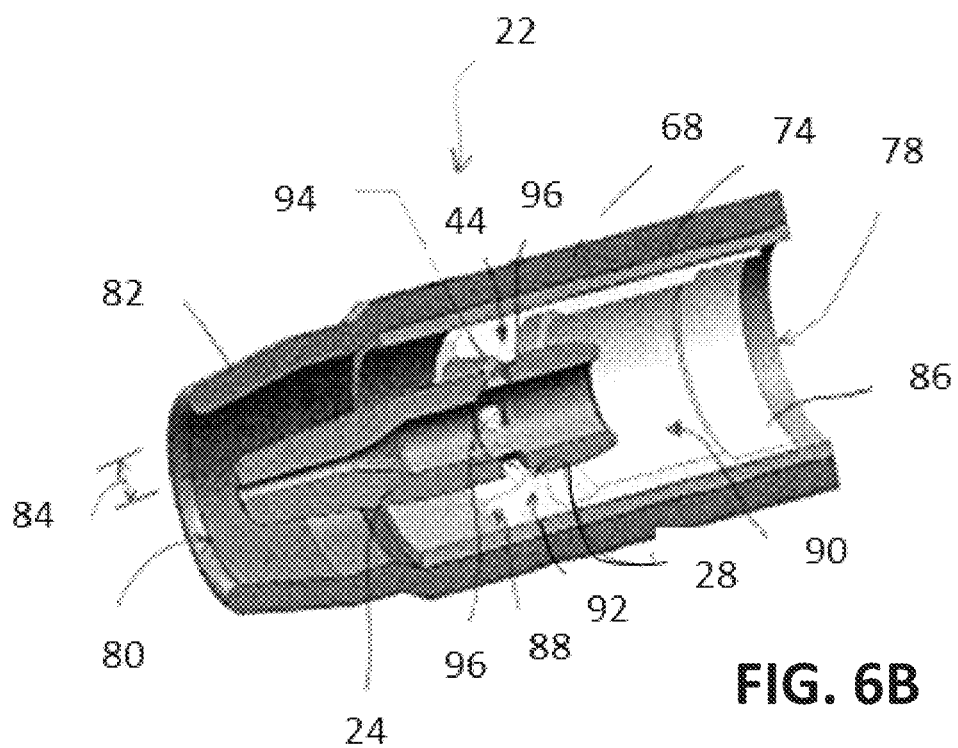
FIG. 6B is a perspective cross-sectional view of another form of a consumable assembly constructed in accordance with the teachings of the present disclosure.
Figure 6C:
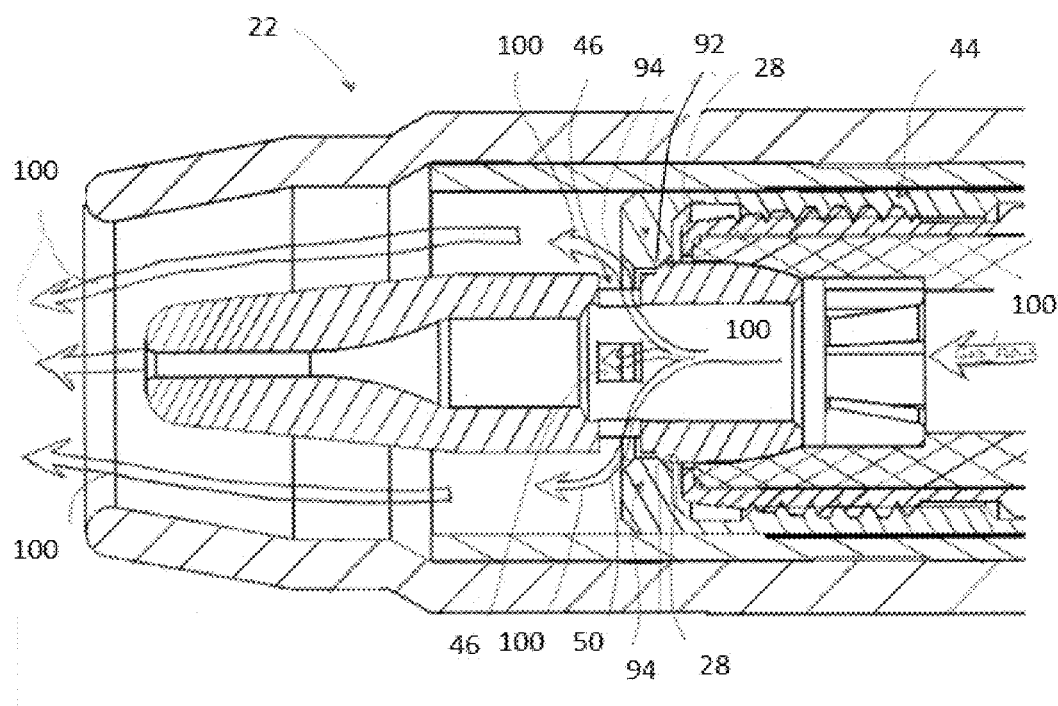
FIG. 6C is an enlarged side cross-sectional view of an nozzle insert and a tip of the consumable assembly of FIG. 6A.
Figure 7:
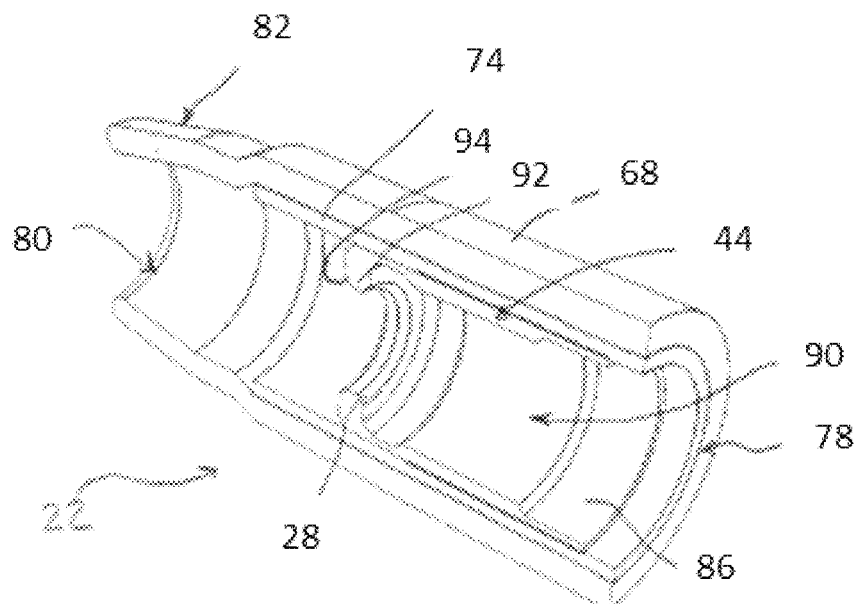
FIG. 7 is a perspective cross-sectional view of a nozzle assembly constructed in accordance with the teachings of the present disclosure.
Figure 8:
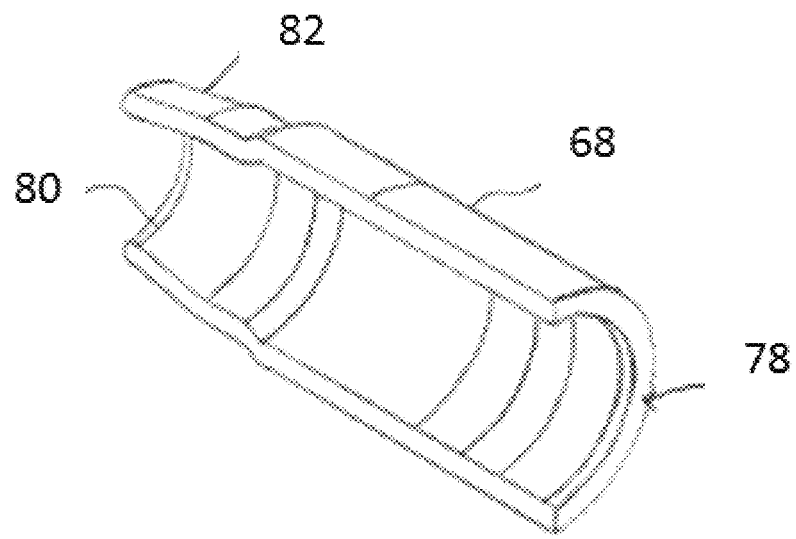
FIG. 8 is a perspective cross-sectional view of a nozzle body constructed in accordance with the teachings of the present disclosure.
Figure 9:
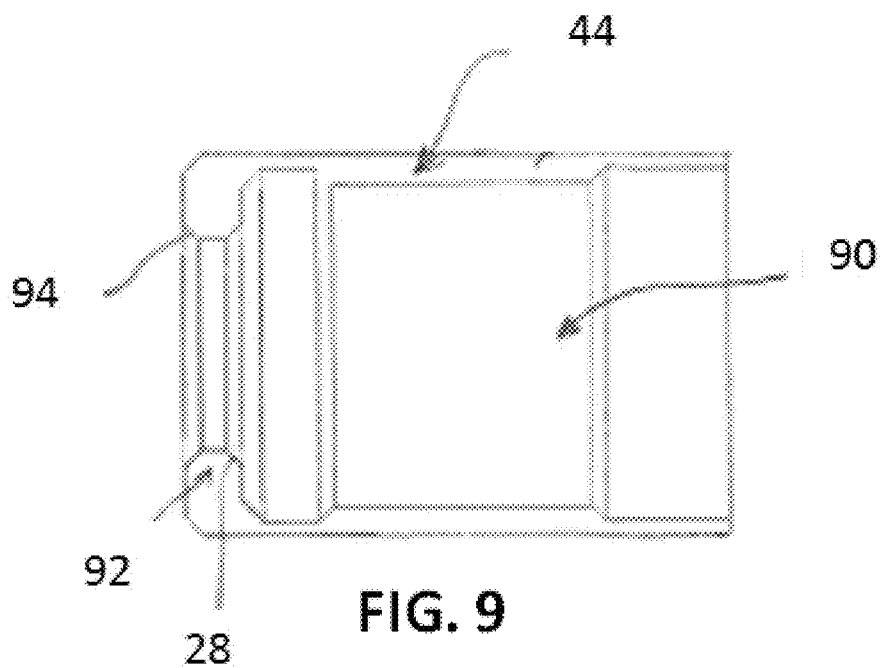
FIG. 9 is a side cross-sectional view of a nozzle insert of a nozzle assembly constructed in accordance with the teachings of the present disclosure.
Figure 10:
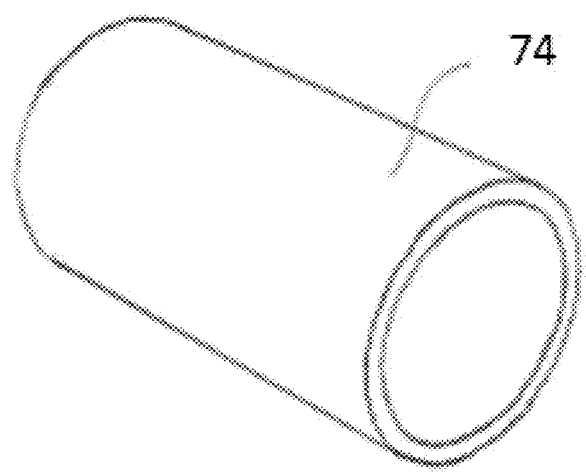
FIG. 10 is a perspective of an insulator of a nozzle assembly constructed in accordance with the teachings of the present disclosure.

As shown in FIG. 6C, the profiled diverter orifice 94 extends around the apertures 96 of the contact tip 24. The gas flow, indicated by the path arrows 100, is directed distally through the internal cavity 58, and then radially outwards through the apertures 96. The profiled diverter orifice 94 then directs the gas flow exiting the apertures 96 distally around an exterior portion of the contact tip 24 as shown. The profiled diverter orifice 94 may extend various lengths from the contact seat 28 (as shown in FIGS. 6A and 6B) and include a variety of geometries, in addition to the chamfered configurations as illustrated herein. In addition, the profiled diverter orifice 94 may extend at any angle that will change the direction of the shield gas to improve the flow characteristics or cooling of the contact tip 24 and surrounding nozzle assembly 22. For example, to generate a laminar flow along the length of the contact tip 24.

The nozzle insert 44 may be manufactured by various methods including machining or a metal injection molding process, also known as MIM. In addition, the nozzle insert may be made from various metals and alloys, for example, in one form the nozzle insert 44 is made of brass.

According to one aspect of the present disclosure, a nozzle assembly is provided that comprises an insulator having a plurality of grooves around an outer periphery. The insulator has a plurality of sealing members disposed within the grooves of the insulator, and a nozzle body slip-fit around the insulator.

Figure 11:
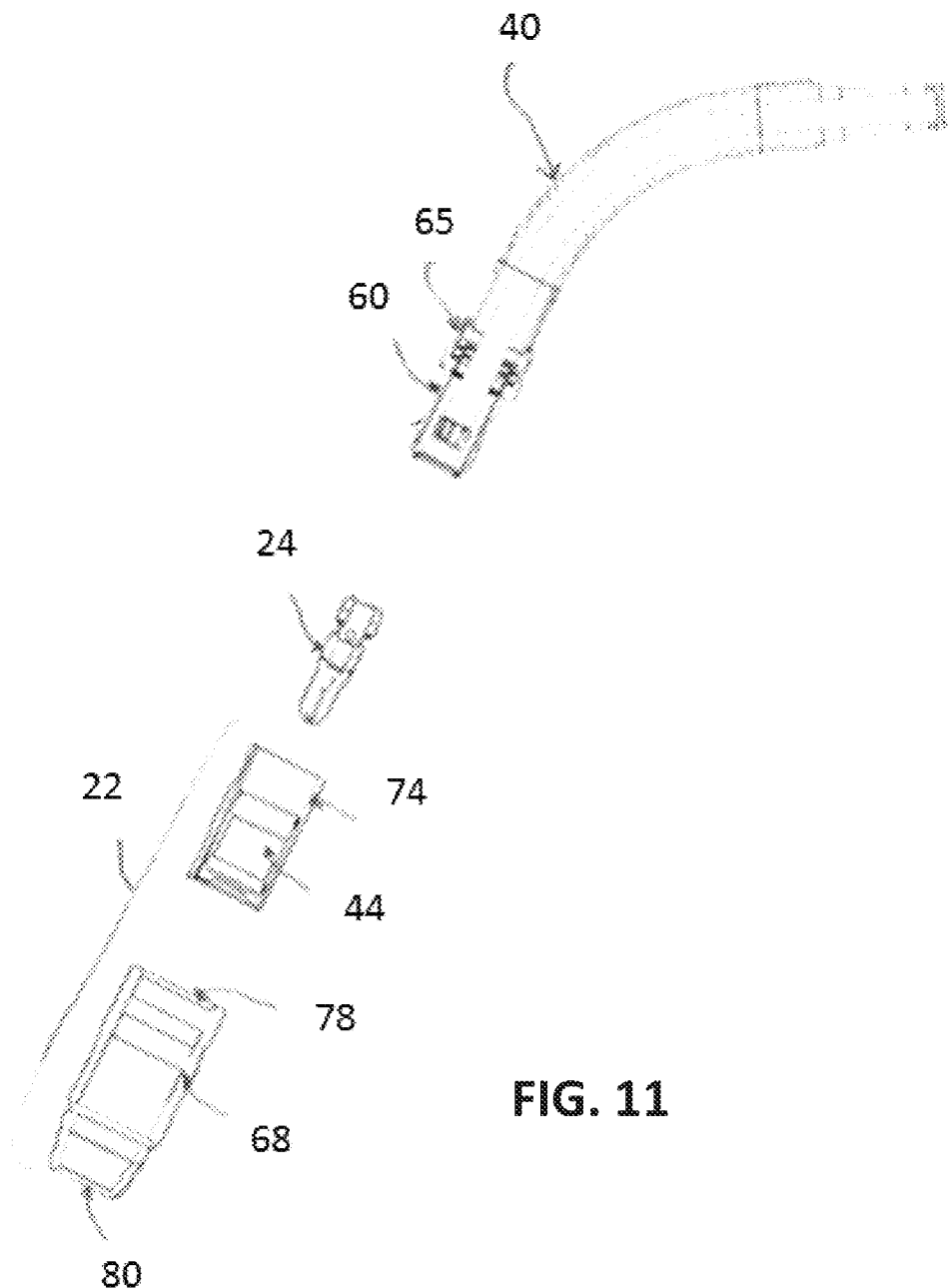
FIG. 11 is an exploded side view of another form of a nozzle assembly, a contact tip, and a conductor tube assembly constructed in accordance with the teachings of the present disclosure.
Figure 12A:
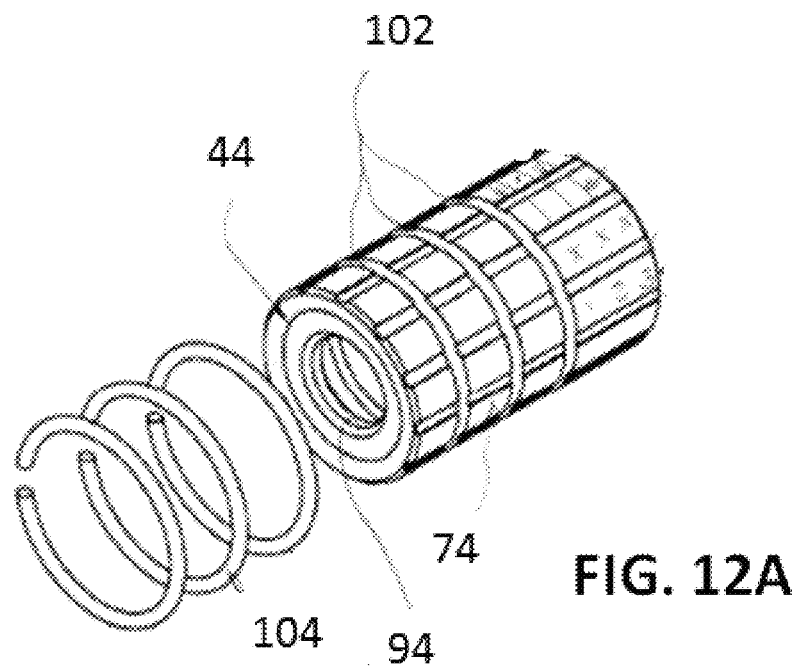
FIG. 12A is a perspective view of another form of an insulator body constructed in accordance with the teachings of the present disclosure.
Figure 12B:
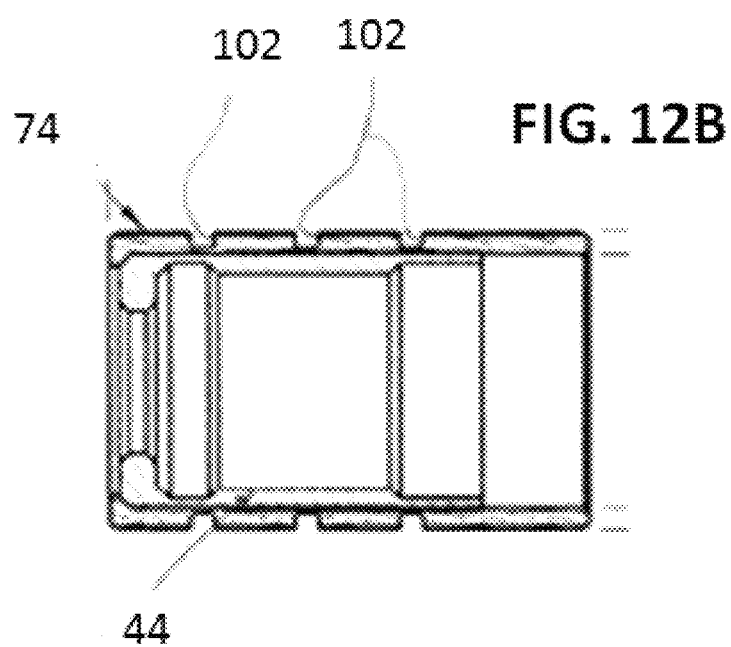
FIG. 12B is a cross-sectional view of another form of an insulator body and nozzle insert constructed in accordance with the teachings of the present disclosure.

Referring now to FIGS. 11, 12A and 12B, in another form, the nozzle assembly includes a nozzle body 68 that is slip-fit around an insulator 74. As shown in FIG. 11, the insulator 74 and a nozzle insert 44 define an assembly and are secured to the sleeve 60 on the conductor tube assembly 40. In one form, the insulator 74 is secured around the nozzle insert 44. As further shown in FIGS. 12A and 12B, the insulator 74 includes a plurality of grooves 102 around its outer periphery. The grooves 102 are used for locating and seating sealing members 104, which provide a sealing engagement between the nozzle body 68 and the insulator 74. In one form, the sealing members 104 are spring rings that are located within the grooves 102. Although the insulator 74 is illustrated with three (3) grooves 102, it should be understood that a greater or fewer number may be used depending on the application and the length of the nozzle body 68, among other operating parameters.

The consumable components are typically, rated to a duty cycle. The duty cycle is usually determined by the duration of the weld operation and the amperage used during continuous operation of the welding gun. For example, a light duty application may be considered to be those welding operations that are rated and use approximately 250 amperes and below. A medium duty application may be considered to be welding operations with a range from approximately 250 amperes to approximately 350 amperes, and a heavy duty application is generally 350 amperes and above.

Referring to FIG. 13, in one form, a nozzle assembly 200 for a light duty application. The nozzle assembly 200 comprises a nozzle body 202 and an insulator 204. The insulator 204 may be over molded onto the nozzle body 202. As further shown, the insulator 204 defines an internal bore 206 having a plurality of detents 208 at a proximal end portion 207. The detents 208 are a series of grooves that are spaced along the internal bore 206 to progressively engage sealing members 216. The user can adjust the relative position of the nozzle with the distal end of the contact tip 24 depending on the engagement between the detents 208 and the sealing members 216.

The insulator, whether a plastic material or other insulator, has a high strength, hardness and rigidity to provide for durability of the nozzle body 202 and the detents 208. For example, the over molded insulator 204 may be made from a thermoset polyester, such as BMC 6605. However, it is appreciated that the insulator 204 may be any insulating material that can withstand the amperage for the duty cycle of the welding application.

Referring to FIG. 14, another form of a nozzle assembly 300 for a light duty application is shown. The nozzle assembly 300 comprises a nozzle body 302, an insulator 304, and a nozzle sleeve 306. In this form, the nozzle assembly 300 is assembled together by a crimping process to secure the insulator 304 and the nozzle sleeve 309 within the nozzle body 302. The nozzle sleeve 309 defines an internal bore 306 of the nozzle body 302. The internal bore 306 further defines a plurality of detents 308 at a proximal end portion 307. The nozzle sleeve 309 may be a made of various materials including metals such as a copper alloy, brass alloy, or alternately plastic materials. Other materials may be used as long as the material and withstand the heat of the application and the amperage needed for the specific welding application. For example, in a light duty application is generally between 250 to 350 Amperes.

An insert assembly 210, in one form, is the same for both forms of the nozzle body 200, 300 of the light duty applications. The insert assembly 210 has a proximal exterior surface 212 with a plurality of groove 214, and a plurality of spring bands 216. The spring bands in this form are split ring metal seals that provide an outward bias and engage into the detents to provide a user with a haptic feedback on the position of the nozzle assembly. The spring bands also provide a bias force to secure the nozzle assembly 200, 300 to the insert assembly 210. The insert assembly 210 is threaded onto the conductor tube (not shown) and secures the contact tip 24 to the conductor tube (not shown). The insert assembly 210 for the light duty applications has two grooves 214 each for retaining a spring band 216. The nozzle bodies 200, 300 define three detents 216 that secure the nozzle body 200, 300 in three positions relative to a distal opening of the nozzle body and the contact tip. The nozzle body slides and locks the detents into positions relative to the contact tip for adjusting the flow characteristics of the shield gas to accommodate a wide variety of welding parameters and user preferences.

Referring now to FIGS. 15 and 16, another form of the nozzle assembly for medium and heavy duty applications is described. The nozzle assembly may be scaled and sized to accommodate a variety of diameters of welding wire and consumables components. It is also appreciated that the materials may vary depending on the duty cycle and the amperage rating. In this form, the nozzle assembly 400 includes a nozzle body 402. The nozzle body 402 may be a singular metal component, typically a copper alloy, but may be formed of various other metals and alloys, among other temperature and durability capable materials, while remaining within the scope of the present disclosure. The nozzle body 402 has an internal bore 406 with a plurality of detents 408 within a portion 407 of the internal bore 406.

The medium and heavy duty applications may also include in an alternate form an insert assembly 410 that includes a nozzle insert 418, insulator 420 and a slip adapter 420, which are secured together in one form by a crimping process. However, it should be understood that various processes may be used to secure the components of the insert assembly 410 while remaining within the scope of the present disclosure. The slip adapter 422 defines a proximal exterior surface 412 with a plurality of grooves 414, and a plurality of spring bands 416. The spring bands 416 in this form include a split spring ring, as in the previous forms and a spring metal band 424. The grooves 414 may vary in width to accommodate the spring band 416. And the spring bands 416 may be customized, such as by way of example, a metal band 424 that defines circumferentially spaced protrusions 426. The metal band provide the biased outward force and the protrusions 426 are designed to engage within the plurality of detents 408 of the internal bore 406 of the nozzle body 402. During adjusting of the nozzle body 402 the protrusions 426 provide tactile feedback and assist the user with locating the nozzle body 402 at the desired location relative to the distal end of the contact tip (not shown).

The various forms of the present disclosure provide a simplified structure, more uniform heat distribution and improved cooling to increase consumable life, among other benefits. The various forms of the present disclosure further provide additional adjustments to a nozzle assembly, thereby allowing a consumable assembly to be adaptable for a wider variety of applications.

What is claimed is:

1. A nozzle assembly for a welding torch comprising:
   a nozzle body surrounding an insulator, the insulator having an interior surface defining an internal bore with a plurality of detents disposed along the interior surface within a portion of the internal bore; and
   an insert assembly having a proximal exterior surface with a plurality of sealing members;
   wherein the insert assembly is adapted to be secured within the internal bore of the insulator of the nozzle body by the plurality of sealing members progressively engaging the plurality of detents.

2. The nozzle assembly according to claim 1, wherein the insulator is over molded onto the nozzle body, the plurality of detents being located at a proximal end portion of the insulator.

3. The nozzle assembly according to claim 2, wherein the plurality of detents is a series of grooves spaced along the internal bore to progressively engage the sealing members.

4. The nozzle assembly according to claim 2, wherein the insulator is a material capable of withstanding the amperage used in a duty cycle of the welding torch.

5. The nozzle assembly according to claim 1, wherein the nozzle assembly further comprises a nozzle sleeve secured within the insulator, such that the nozzle sleeve further defines the internal bore.

6. The nozzle assembly according to claim 5, wherein the nozzle sleeve comprises one selected from a metal, a metal alloy, or a plastic material that is capable of withstanding the amperage applied to the welding torch and the heat generated during the use of the torch.

7. The nozzle assembly according to claim 1, wherein the sealing members of the insert assembly are defined by a plurality of grooves in the proximal exterior surface and a plurality of spring bands disposed within the grooves.

8. The nozzle assembly according to claim 7, wherein the spring bands are split ring seals that provide an outward bias force and engage the plurality of detents.

9. The nozzle assembly according to claim 8, wherein the outward bias force secures the insert assembly to the nozzle body.

10. The nozzle assembly according to claim 1, wherein the insert assembly is threaded onto a conductor tube and secures a contact tip to the conductor tube.

11. The nozzle assembly according to claim 10, wherein the insulator has three detents that secures the nozzle body to the insert assembly in three positions relative to a distal opening in the nozzle body and the contact tip.

12. An arc welding apparatus, the arc welding apparatus comprising:
 a handle;
 a conductor tube attached to the handle; and
 a consumable assembly attached to the conductor tube;
  the consumable assembly comprising a contact tip and a nozzle assembly;
 wherein the nozzle assembly comprises:
  a nozzle body surrounding an insulator, the insulator having an interior surface defining an internal bore with a plurality of detents disposed along the interior surface within a portion of the internal bore; and
  an insert assembly having a proximal exterior surface with a plurality of sealing members;
  wherein the insert assembly is adapted to be secured within the internal bore of the insulator of the nozzle body by the plurality of sealing members progressively engaging the plurality of detents.

13. The welding apparatus according to claim 12, wherein the insulator is over molded onto the nozzle body, the plurality of detents being located at a proximal end portion of the insulator.

14. The welding apparatus according to claim 13, wherein the plurality of detents is a series of grooves spaced along the internal bore to progressively engage the sealing members.

15. The welding apparatus according to claim 12, wherein the nozzle assembly further comprises a nozzle sleeve secured within the insulator, such that the nozzle sleeve further defines the internal bore.

16. The welding apparatus according to claim 12, wherein the sealing members of the insert assembly are defined by a plurality of grooves in the proximal exterior surface and a plurality of spring bands disposed within the grooves.

17. The welding apparatus le assembly according to claim 12, wherein the insert assembly is threaded onto the conductor tube and secures the contact tip to the conductor tube.

* * * * *